United States Patent [19]

Hill

[11] 3,728,636

[45] Apr. 17, 1973

[54] INVERSE LOGARITHMIC FUNCTION GENERATOR

[75] Inventor: Charles W. Hill, Linthicum Heights, Md.

[73] Assignee: The United States of America as represented by the Secretary of the Navy

[22] Filed: Dec. 28, 1971

[21] Appl. No.: 212,924

[52] U.S. Cl. ..................328/145, 307/229, 330/30 D

[51] Int. Cl. ..................H03k 17/00

[58] Field of Search ..................307/229; 328/145; 330/30 D

[56] References Cited

UNITED STATES PATENTS

| | | | |
|---|---|---|---|
| 3,524,074 | 8/1970 | Pratt, Jr. | 328/145 |
| 3,448,289 | 6/1969 | Harris | 328/145 |

*Primary Examiner*—John W. Huckert
*Assistant Examiner*—B. P. Davis
*Attorney*—R. S. Sciascia et al.

[57] ABSTRACT

An inverse or anti-logarithmic function generator wherein the systems input is one input of a differential amplifier whose output is integrated and fed into the input of a log generator, whose output is the other input to the differential amplifier. The integrated output of the differential amplifier is the inverse log of the systems input.

8 Claims, 2 Drawing Figures

INVERSE LOGARITHMIC FUNCTION GENERATOR

BACKGROUND OF THE INVENTION

1. Field of the invention

The present invention relates generally to anti-logarithmic function generators and more particularly to an anti-logarithmic function generator using a log generator in a closed loop system.

In many types of electronic circuits, it is often necessary to perform non-linear operations such as obtaining the anti-logarithm of voltage or current. This ability in conjunction with logarithmic circuits, makes it possible to perform multiplication, division, raising to a constant power, and many other operations.

2. Description of the prior art

Previous anti-logarithmic circuits using a logarithmic device and feedback loop, have encountered the difficulties of poor frequency response, poor direct current stability, a need for setting and matching direct current levels, the general complexity of the arrangement, and elaborate temperature compensating circuitry.

SUMMARY OF THE INVENTION

In general, the present invention uses a differential amplifier, one of whose inputs is the independent variable and the other input is a feedback signal. The output is integrated and used to drive a logarithmic amplifier until its output, which is the other input to the differential amplifier, is equal to the independent variable. When the fedback input level reaches this final value, the integrator holds as its output the inverse log of the independent variable.

OBJECTS OF THE INVENTION

It is an object of the invention to provide an inverse or anti-logarithmic generator.

Another object is to provide an anti-logarithmic function generator whose accuracy is not affected by the ambient temperature variations.

A further object of the invention is to use a log generator in the feedback loop of a differential amplifier to provide the anti-logarithm of the system's input.

Still another object of the invention is to use the novel inverse log generator in the AGC feedback loop of an amplifier.

A still further object of the invention is to use the novel inverse log generator with linear AGC amplifier to provide a log-linear AGC amplifier.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
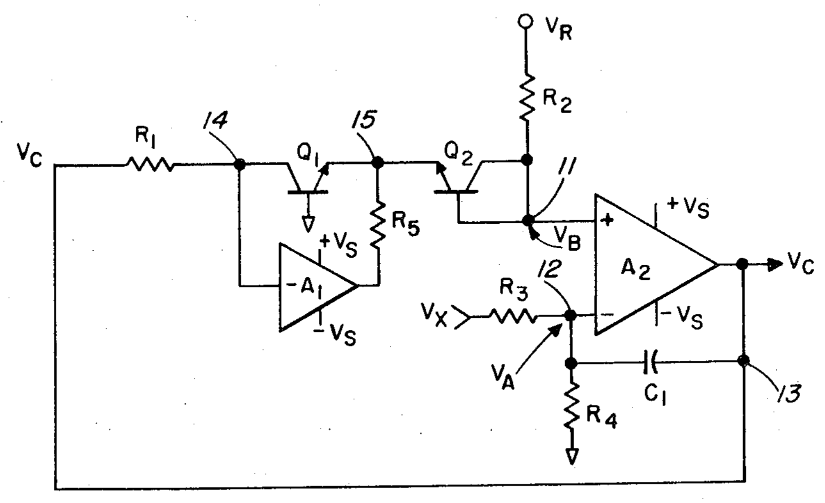
FIG. 1, a schematic circuit diagram of the preferred embodiment of the anti-logarithmic function generator according to this invention.

FIG. 1, which illustrates a preferred embodiment of the inverse log generator, shows a differential amplifier $A_2$ having an input $V_A$ and input $V_B$. Control voltage $V_X$ is applied across a voltage divider made up of resistor R3 and R4 to produce the differential amplifier input signal $V_A$. $V_C$ is the integrated output resulting from the control voltage $V_X$. The integrator's time constant is determined by R3, R4 and C1. When the two inputs $V_A$ and $V_B$ to differential amplifier A2 are equal, $V_C$ reaches its final value and the integrator stops and holds this final value of $V_C$.

The output voltage $V_C$ is fed back through resistor R1 to the junction 14 of the collector of transistor Q1 and the input to operational amplifier A1. Resistor R1, transistor Q1, amplifier A1, and resistor R5 are connected such that the voltage at the junction 15 of the emitter Q1 and resistor R5 is proportional to the logarithm of the voltage $V_C$. It is known that a transistor has a collector current:

$I_c = (\text{constant})\,(e^{qVeb/kT} - 1) + f(V_{cb})$ $k$ = Boltzmann constant = $1.381 \times 10^{-23}$ joule/°K $T$ = Temperature in °K $g$ = Electronic charge = $1.6 \times 10^{-19}$ coulomb $Veb$ = actual emitter-base junction voltage $Vcb$ = actual collector-base junction voltage.

The semi-conductor lattice and manufacturing techniques will determine $f(Vcb)$ and the "constant". Knowing that when $Vcb$ is zero, $f(Vcb)$ is also equal to zero and that for most cases, one is small in comparison to $e^{qVeb/kT}$, then $I_c$ becomes an expondential function of $Veb$,ie $Ic = (\text{constant})\ e^{qVeb/kT}$. Thus the output voltage at 15 is equal to Veb, which is proportional to the log of the collector current of transistor Q1.

Transistor Q2 with its base and collector shorted together functions as a diode. Reference voltage $V_R$, resistor R2 and transistor Q2 function as a negative bias for junction 15, such that for a given voltage $V_C$ there is 0 volts occurring at junction 11. The circuit from point 13 to point 11 is known to have the following transfer function:

$$V_B = (2.3\ kT/q) \log (V_C/V_R)\ (R_2 R_1)$$

To obtain the desired inverse log function, $V_C$ must be the dependent variable and $V_B$ the independent variable in the above equation. This has been done in FIG. 1 by closing the entire circuit in a loop with an integrator in such a manner that $V_A$ is introduced into the loop as an error. The integrator drives the log amplifier input until it's output $V_B$ is equal to $V_A$ and thus the error is reduced to 0. At that point, the integrator holds value $V_C$, which is related to the input control voltage $V_X$ by the desired equation:

$$V_C = \frac{V_R R_1}{R_2} 10 \frac{-V_X R_{4q}}{2.3(R_3 + R_4)kT}$$

$$= \frac{V_R R_1}{R_2} \log^{-1} \frac{-V_X R_{4q}}{2.3(R_3 + R_4)kT}$$

where $V_B = V_A = (V_X R_4 / R_3 + R_4)$

The circuit values $R1$, $R2$, $R3$, $R4$, and $V_R$ may be adjusted to produce the desired transfer function. K, Boltzmann constant, and $q$, electronic charge, are unalterable physical constants. The variable T, temperature, can be fixed by using a constant temperature pair of transistors, such as UA726, for transistors Q1 and Q2. This transistor pair is grown on the same substrate with a temperature regulating circuit and thus can be held at a constant temperature of approximately 100° centigrade. Thus the disclosed inverse log generator is independent of environmental temperatures.

Figure 2:
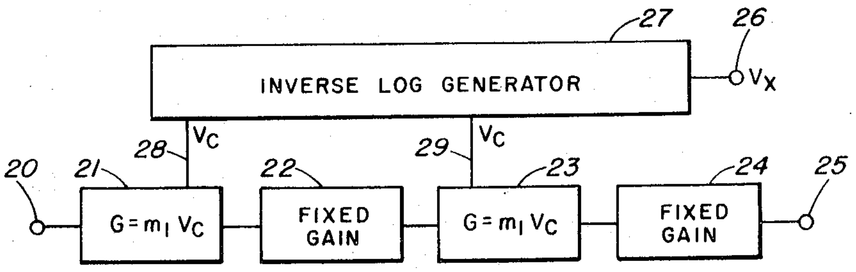
FIG. 2, a block diagram of the application of this invention in the AGC of an amplifier system.

One possible use of the inverse log generator is in the automatic gain control of an amplifier, as depicted in FIG. 2.

The mechanics of gain control loops require that the AGC characteristics of the amplifier be log-linear if the loop is to retain a constant bandwidth and a given phase margin over the AGC range of the amplifier. If the amplifier is precisely log-linear, and its slope is accurately controlled, valuable information can be extracted from the loop by monitoring the amplifier control voltage. For example, the magnitude of the signal is known and percent of modulation is known. Rate of rise of control voltages is also significant information if the loop bandwidth is constant, which it is in a log-linear system.

The usual methods of gain control are to utilize the forward or reverse AGC characteristics of a transistor or the impedance of a common diode as a function of the current through it. The trouble with these methods are a non-repeatability from one unit to the next, which usually calls for extensive "tailoring" of these individuals circuits to provide several identical amplifiers. There is the additional problem of obtaining log-linearity. The curve is usually approximately by several straight lines of different slopes added together to form an exponential curve.

Referring now to FIG. 2, the system's input signal is applied to terminal 20, which is the input of linear AGC amplifier 21. The gain of this amplifier is a linear function of its control voltage $V_C$ not the log of the gain as is desired. The signal is then fed through a fixed gain amplifier 22, another linear AGC amplifier 23 and a final stage of amplification by fixed gain amplifier 24 to output terminal 25. After further processing the signal is fedback as voltage $V_X$ to the input terminal 26 of inverse log generator 27. The output of the inverse log generator 27, at terminals 28 and 29, is used to control linear AGC amplifier 21 and 23, respectively. It should be noted that linear AGC amplifiers 21 and 23 are truly linear in gain/control voltage, not mere approximations. By using two log linear AGC amplifiers, each provide half the AGC range in db of the system. Thus two decades of gain change can be realized with only one decade of range used in the inverse log generator. It can be seen by extending this principle, practically any amount of attenuation can be achieved while the inverse log generator operates over a very reasonable dynamic range.

The gain in db of a log-linear AGC amplifier should be a linear function of the control voltage, i.e. $G(db)=mV+B$. Using linear gain/volt AGC amplifiers 21 and 23, we know that the gain is a linear function of its control voltage, i.e. $G=m_1V_C$. The relationship between gain in db and gain is $G=\text{Log}^{-1}\ G(db)/20$. Thus, to achieve the desired results, i.e. $G(db)$ is a linear function of $V_X$, using the known characteristics of linear AGC amplifiers 21 and 23, i.e. $G$ is a linear function of $V_C$, and the inverse log relationship of $G(db)$ and $G$, $V_C$ must be expressed as a function of $V_X$ and substituted into the equation $G=m_1V_C$. The inverse log generator 27 provides the desired relationship between $V_X$ and $V_C$, i.e. it expresses $V_C$ as the inverse log of $V_X$.

Thus it can be seen that the embodiment of FIG. 1 achieves exact log-linear AGC amplification, not an approximation, by the use of the novel anti-log generator of FIG. 1 and linear voltage AGC amplifiers 21 and 23. The bandwidth and the loop transfer function are independent of input signal and environmental conditions.

Obviously many modifications and variations of the present invention are possible in light of the above teachings. It is therefore to be understood that, within the scope of the appended claims, the invention may be practiced otherwise than as specifically described.

I claim:

1. An inverse logarithmic function generator comprising:

a differential amplifier having a first and second inputs, an output, and an integrator feedback;

a logarithmic function generator whose input is connected to said output of said differential amplifier and whose output is connected to said first inputs of said differential amplifier; and a control voltage connected to said second input of said differential amplifier, whereby the voltage on said output of said differential amplifier is the inverse logarithm of said control voltage and is held at that value by said integrator.

2. An inverse logarithmic function generator according to claim 1 further including a biasing means connected between the output of said log function generator and said first input of said differential amplifier so that for a given voltage out of said differential amplifier there is zero volts on said first input of said differential amplifier.

3. An inverse-logarithmic function generator according to claim 2, wherein said biasing means comprises:

a transistor with its emitter connected to the output of said log generator and its base and collector shorted together at said first input of said differential amplifier; and a voltage supply connected through a resistor to said shorted base and collector.

4. An inverse-logarithmic function generator according to claim 1, wherein said log function generator comprises:

an operational amplifier with a first end of a first resistor connected to its output;

a transistor whose base is grounded, its collector connected to the input of said operational amplifier, and its emitter connected to the second end of said first resistor; and a first end of a second resistor connected to the junction of the input of said operational amplifier and said transistor's collector, whereby the second end of said second resistor is the input of said log generator and the junction of said emitter and said second end of said first resistor is the output of said log generator.

5. An amplifier system with log linear AGC comprising:

a first amplifier with a signal input, a control voltage input and an output;

a second amplifier whose input is connected to the output of said first amplifier and which is of fixed gain;

a third amplifier whose signal input is connected to the output of said second amplifier and which has a control voltage input and an output;

a fourth amplifier whose input is connected to the output of said third amplifier and which is fixed gain; and an inverse log generator having an input and an output, said input connected to receive a signal feedback from the output of said fourth amplifier and said output connected to said control voltage inputs of said first and third amplifiers, whereby the input of said first amplifier is the input of said amplifier system and the output of said fourth amplifier is the output of said amplifier system.

6. An amplifier system with log linear AGC according to claim 5 wherein said first and third amplifiers are amplifiers whose gain are the linear function of its control voltage.

7. An amplifier system with log linear AGC according to claim 6 wherein said inverse log generator comprises:

a differential amplifier having a first and second inputs, an output, and an integrator feedback;

a logarithmic function generator whose input is connected to said output of said differential amplifier and whose output is connected to said first inputs of said differential amplifier; and a control voltage connected to said second input of said differential amplifier, whereby the voltage on said output of said differential amplifier is the inverse logarithm of said control voltage and is held at that value by said integrator.

8. An amplifier system with log linear AGC according to claim 7 wherein said log function generator comprises:

an operational amplifier with a first end of a first resistor connected to its output;

a transistor whose base is grounded, its collector connected to the input of said operational amplifier, and its emitter connected to the second end of said first resistor; and a first end of a second resistor connected to the junction of the input of said operational amplifier and said transistor's collector, whereby the second end of said second resistor is the input of said log generator and the junction of said emitter and said second end of said first resistor is the output of said log generator.

* * * * *